3,558,708
1,7-BIS(DIFLUORAMINO)-2,4,6-TRINITRO-2,4,6-TRIAZAHEPTANE

Robert K. Armstrong, Glassboro, and Gerald L. Brennan, Woodbury, N.J., assignors to E. I. du Pont de Nemours and Company, Wilmington, Del., a corporation of Delaware
No Drawing. Filed Aug. 19, 1963, Ser. No. 303,725
Int. Cl. C07c *111/00*
U.S. Cl. 260—583                                 4 Claims This invention pertains to a composition of matter suitable for use as an explosive and as a component of propellant and gas generating compositions. More particularly, this invention pertains to 1,7-bis(difluoramino)-2,4,6-trinitro-2,4,6-triazaheptane, a compound represented by the formula

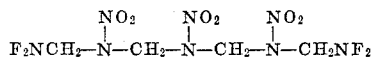

and a method for preparing said composition.

The compound of the invention is made by mixing difluoroamine with a solution of a 1,7-diacyloxy-2,4,6-trinitro-2,4,6-triazaheptane in a halogenated alkane in the presence of a strongly acidic cation exchange resin catalyst, holding the mixture at a temperature of about 50° C. for at least 72 hours, separating the catalyst, and removing volatile materials by distillation to recover the composition of the instant invention.

The invention is described and illustrated more fully in the following example in which all parts are by weight unless otherwise indicated.

EXAMPLE

A reaction mixture consisting of 400 parts of 1,7-diacetoxy-2,4,6-trinitro-2,4,6-triazaheptane, 50 parts of a strongly acidic cation exchange resin of the kind made by nuclear sulfonation of a styrene-divinyl benzene copolymer (20–50 mesh, thoroughly dried by heating for two hours at 50° C. at about 0.5 micron pressure), and about 1300 parts of methylene chloride contained in a glass or glass-lined pressure reactor is cooled to −120° C., after which 685 parts by weight of gaseous $HNF_2$ is fed and condensed into the reaction mixture while simultaneously preventing the entrance of air and moisture into the reactor. The reactor is sealed, the contents are stirred by a magnetically driven agitator and gradually brought to a temperature of 25° over a period of about one-half hour, the stirred reaction mixture is held at about 50° C. for at least 72 hours, and then cooled to 25° C. At the end of the reaction period, the components volatile at about 25° C. and a pressure of $10^{-4}$ mm. of mercury are removed from the reactor leaving the desired product as a solid residue which is not adversely affected by exposure to water vapor or air.

The crude product is purified by sublimation at 110° C. at a pressure of about 0.5 micron followed by crystallization from absolute ethyl alcohol, with about 43% recovery as purified product.

The product, 1,7-bis(difluoramino)-2,4,6-trinitro-2,4,6-triazaheptane, is a white crystalline solid melting at 176–7° C. Elemental analysis of the product as prepared by this example gives the following results:

Calc'd for $C_4H_8N_8O_6F_4$ (percent): C, 14.12; H, 2.36; N, 32.93. Found (percent): C, 14.57; H, 2.96; N, 31.82.

Structural features observed in the infrared spectrum are the absence of bands for the acetoxy groups (5.75μ for carbonyl of ester), and presence of bands for N—$NO_2$ at 6.25 and 6.45μ and 7.8–7.9μ and for $CH_2NF_2$ at 12.2–12.4μ. The nuclear magnetic resonance spectrum shows the presence of two kinds of protons in about a 1 to 1 ratio, and a single variety of fluorine-19 nuclei. These spectral characterizations further confirm the structure as that given above for the compound of the invention.

For use in the process hereinabove described, 1,7-diacetoxy-2,4,6-trinitro-2,4,6-triazaheptane can be prepared by the reaction of 97% nitric acid, hexamethylenetetramine dinitrate and acetic anhydride, as described by L. Berman, R. H. Meen, and George F. Wright in the Canadian Journal of Chemistry, vol. 29, p. 775, 1951. Other acyloxy derivatives such as the formyloxy or propionyloxy triazaheptane may be used, but the diacetoxy compound is preferred because of the facile replacement of acetoxy by $NF_2$ groups.

Difluoramine is synthesized by reaction of thiophenol with commercially available tetrafluorohydrazine, as described by J. P. Freeman, A. Kennedy and C. B. Colburn in the Journal of the American Chemical Society, vol. 82, p. 5304, 1960. Difluoramine from other sources is equally effective in preparing the compound of the invention by the method disclosed herein. Whereas only two molar proportions of difluoramine are required for stoichiometric reaction, use of an excess of difluoramine is advantageous in facilitating the replacement of acetoxy groups from positions 1 and 7 of the starting material. In the example above, about 11.5 molar proportions of difluoramine are present, excess material being recovered when volatile materials are removed at the end of the reaction period.

Although methylene chloride is a preferred solvent and reaction medium for the process of the present invention, other halogenated alkanes such as chloroform, carbon tetrachloride, dichlorodifluoromethane, monochlorotrifluoromethane, monochlorodifluoromethane, symmetrical dichlorotetrafluoroethane, and the like may be used in place of or in combination with methylene chloride.

Strongly acidic cation exchange resins of the sulfonic acid type in the hydrogen form are effective catalysts for use in the process of the instant invention. Especially preferred are nuclear sulfonated highly cross-linked copolymers of styrene and divinylbenzene which are commercially available from several sources, for example, the resin designated "Dowex" 50W–X8, 20–50 mesh, in the hydrogen form, as currently supplied by the Dow Chemical Company; and the resin designated "Amberlite" IR–120 as currently supplied by the Rohm and Haas Company. Before use, the acid resin is thoroughly dried by heating for two hours at 50° C. at about 0.5 micron pressure. Another effective catalyst of the preferred class is the macro-reticular resin designated "Amberlyst" 15, as currently supplied by the Rohm and Haas Company.

The compound of the invention is useful as a high explosive comparable in strength to well known explosives such as pentaerythritol tetranitrate (PETN), cyclotrimethylene trinitramine, tetryl, and the like. For example, 1.5 grains of the compound is charged into a 0.240″ diameter blasting cap shell, pressed with a force of 200 pounds on a 0.220″ diameter press pin and primed with lead azide. The base of the loaded cap shell is butted against the square face of a 1″ x 1″ x ½″ piece of 2024T–3 aluminum alloy and the cap is fired ("aluminum block dent test"). The depression is 0.042″ deep. In an identical dent test with 1.5 grains of PETN as the base load, the depression in the aluminum block is only 0.038″ deep.

The compound of the invention also is useful as a component in the formulation of propellant compositions. Because the compound is energy-rich and more nearly oxygen-balanced than conventional fuels, effective propellant compositions can be made with a lesser percentage of the usual oxygen-supplying salts and an increase in percentage of highly exothermic metallic fuel. In the table below are shown two such propellants, one a conventional propellant composition, A, and the other a modified propellant formulated to contain the compound of the invention, B:

|  | A, percent | B, percent |
|---|---|---|
| Nitrocellulose | 15.25 | 15.0 |
| Triethyleneglycol dinitrate | 37.40 | 37.2 |
| Nitroglycerin | 1.25 | 1.4 |
| Ammonium perchlorate | 29.83 | 16.83 |
| 1,7-bis(difluoramino)-2,4,6-trinitro-2,4,6-triazaheptane |  | 8.8 |
| Aluminum powder | 15.0 | 19.4 |
| Resorcinol | 1.0 | 1.0 |
| 2-nitrosodiphenylamine | 0.2 | 0.3 |
| Carbon black | 0.07 | 0.07 |
|  | 100.00 | 100.00 |

Propellant B has a calculated specific impulse of 262.7 lb./sec./lb. (shifting equilibrium, 1000 p.s.i. to 1 atms.), whereas propellant A (reference composition) has a calculated specific impulse of 258.7 lb./sec./lb.. The increase of 4 units in the value of the specific impulse is a marked improvement at the indicated level of performance. Both performance values are based on the most recent Joint Army-Navy-Air Force Thermodynamic data.

It will be understood that numerous changes and modifications may be made in the subject matter described above without departing from the scope of the invention as defined in the appended claims.

What is claimed is:
1. 1,7-bis(difluoramino) - 2,4,6 - trinitro - 2,4,6-triazaheptane.
2. A process for the preparation of 1,7-bis(difluoramino))-2,4,6-trinitro-2,4,6-triazaheptane comprising mixing difluoramine with a solution of 1,7-diacyloxy-2,4,6-trinitro-2,4,6-triazaheptane in a halogenated alkane in the presence of a strongly acidic cation exchange resin, holding the mixture at a temperature of about 50° C. for at least 72 hours, separating the resin, and removing volatile materials by distillation.
3. The process of claim 2 in which the diacyloxy compound is 1,7 - diacetoxy-2,4,6-trinitro-2,4,6-triazaheptane, the halogenated alkene is methylene chloride, and the resinous acid catalyst is a sulfonated cation exchange resin in the hydrogen form.
4. The process of claim 3 in which the catalyst is the hydrogen form of a nuclear sulfonated highly crosslinked copolymer of styrene and divinylbenzene.

References Cited

Hoffman et al.: Chem. Reviews, vol. 62, pp. 12 to 18 (1962).

LELAND A. SEBASTIAN, Primary Examiner

U.S. Cl. X.R.

149—42, 88, 97, 109